(12) United States Patent
Viallet

(10) Patent No.: US 6,310,411 B1
(45) Date of Patent: Oct. 30, 2001

(54) LOCK ASSEMBLY FOR A PERSONAL COMPUTER ENCLOSURE

(75) Inventor: Franck Viallet, Meylan (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/406,561

(22) Filed: Sep. 27, 1999

(30) Foreign Application Priority Data

Apr. 21, 1999 (EP) .................................................. 99400997

(51) Int. Cl.[7] .............................. H05K 7/16; H01H 61/06
(52) U.S. Cl. ........................ 307/125; 361/726; 70/163; 70/277; 337/140
(58) Field of Search ................................. 70/77, 158, 163, 70/275, 277, 278, 333 R, 416, DIG. 10; 361/683, 726; 307/125; 337/140

(56) References Cited

U.S. PATENT DOCUMENTS

| 5,548,981 | 8/1996 | Kirk | 70/58 |
| 5,598,323 | 1/1997 | Muller | 361/726 |
| 5,769,159 | * 6/1998 | Yun | 165/276 |
| 5,905,446 | * 5/1999 | Benore et al. | 70/278 |
| 5,977,858 | * 11/1999 | Morgen et al. | 337/140 |
| 5,990,777 | * 11/1999 | Whiteman, Jr. | 337/140 |
| 6,008,992 | * 12/1999 | Kawakami | 361/726 |
| 6,082,153 | * 7/2000 | Schoell et al. | 70/333 R |
| 6,240,727 | * 6/2001 | Goldstein et al. | 60/528 |

\* cited by examiner

Primary Examiner—Josie Ballato
Assistant Examiner—Rios Roberto

(57) ABSTRACT

A lock assembly is described for a personal computer. The assembly comprises a lock member movable between a locked position and an unlocked position and a shape memory wire arranged to move the lock member between the lock position and the unlocked position in response to one or more electrical signals that generate currents therein.

10 Claims, 3 Drawing Sheets

LOCK ASSEMBLY FOR A PERSONAL COMPUTER ENCLOSURE

FIELD OF THE INVENTION

The present invention relates to locks and, more particularly, to an electrically controlled lock suitable for use in locking personal computer cases.

BACKGROUND OF THE INVENTION

It is highly desirable to secure the cover of a personal computer in order to protect information stored in the computer and to prevent unauthorised access to or removal of the components within the case.

One known lock system used for instance in the HP Vectra series of computers is a mechanism similar to a conventional key operated lock, actuated by a key in the rear of the machine. Two people are enabled to unlock the cover: the key owner and the system manager. The system manager can open all machines that he is in charge of using a programmable master key. Other examples of key operated locks can be found described in U.S. Pat. No. 5,548,981 and U.S. Pat. No. 5,598,323.

One of the main advantages of using key operated locks is that the cover can be removed even if there is no power on. However, if a technician is required to open the computer to repair or replace a component, then that person must be physically in possession of one of the keys. It is not with this system possible to provide for software control of the lock to enable desirable functionality such as remote locking and unlocking of the cover or password controlled access.

Such features are particularly desirable for customers that own and manage very many PCs, and therefore that need to manage access to hardware more easily. If hardware changes are desired in many machines at the same time, the system manager can access systems without having to locate keys and can unlock machines over a computer network, using appropriate hardware management software tools like ones included in the HP Toptools package, available from Hewlett-Packard Company.

In order to allow remote locking and unlocking of computer covers, electronically controlled cover lock mechanisms have been used. For example the Compaq Deskpro 4000 and 6000 models employ an electromechanical lock that use a bistable solenoid.

A bistable lock is needed because safety specifications require the machine to be switched off for the removal of the cover. In consequence, the unlocked position of the soft lock has to be mechanically stable. Since the need for security requires that the lock prevent the removal of the cover even if the machine is not supplied with power, the lock position has also to be mechanically stable.

A suitable bistable solenoid for use in such locks is the MSA model L-09432 that is available from MAGNET-SCHULTZ OF AMERICA. This solenoid is electronically connected to the computer motherboard by 3 wires (−12V, 0, 12V). The locking and unlocking operation is performed by powering the solenoid during one second.

Whilst this solution is generally satisfactory, it is relatively expensive and does present certain drawbacks. For instance, use of a solenoid creates a certain amount of electromagnetic radiation. Since the electromagnetic emissions from computers are subject to strict controls, extra shielding or special design of the case may be required to reduce the radiation coming from the solenoid. In addition, the solenoid coil itself is inevitably somewhat bulky and adds to the weight of the computer.

This invention is directed to mitigating the drawbacks of the prior art.

SUMMARY OF THE INVENTION

In brief, this is achieved by a lock assembly for a personal computer comprising a lock member movable between a locked position and an unlocked position and a shape memory wire arranged to move the lock member between the lock position and the unlocked position in response to one or more electrical signals that generate currents therein.

In a preferred embodiment, the lock assembly is provided with a bistable mechanical biasing arrangement for biasing the lock member into the locked position or the unlocked position. Suitably, the mechanical biasing arrangement can be a leaf spring.

In one implementation, the shape memory wire includes a first portion forming a first current path for pulling the lock member into the lock position and a second portion forming a second current path for pulling the lock member into the unlocked position.

For convenience, one end of the first current path and one end of the second current path can be connected to a common terminal, the first and second current paths each comprising respective terminals at ends remote from the common terminal. In this arrangement, a lock signal is represented by a voltage applied between the terminal at the end of the first current path and the common terminal and an unlock signal is represented by a voltage applied between the terminal at the end of the second current path and the common terminal.

Also provided is a computer comprising a housing having a first section having a wall defining an opening for allowing access to internal components of the computer; a cover section for engaging the first section to close the housing; and a lock assembly as described arranged to prevent or allow disengagement of the first section and the cover.

This arrangement has the advantages of the solenoid-based solution described above but can be implemented at reduced cost. In addition EM emissions and the weight and bulk of the device are reduced. Whilst the shape memory wire is in some ways less robust than the solenoid solution, the invention is based in part on the recognition that in this application the actual number of cycles that the lock needs to tolerate is relatively low—the number of times that the case needs to be opened is perhaps as low as only 100 over the life of the machine. Commercially available shape memory alloy wires are easily capable of surviving this number of duty cycles.

BRIEF DESCRIPTION OF THE DRAWINGS

A personal computer embodying the invention will now be described, by way of non-limiting example, with reference to the accompanying diagrammatic drawings, in which.

BEST MODE OF CARRYING OUT THE INVENTION

Figure 1:
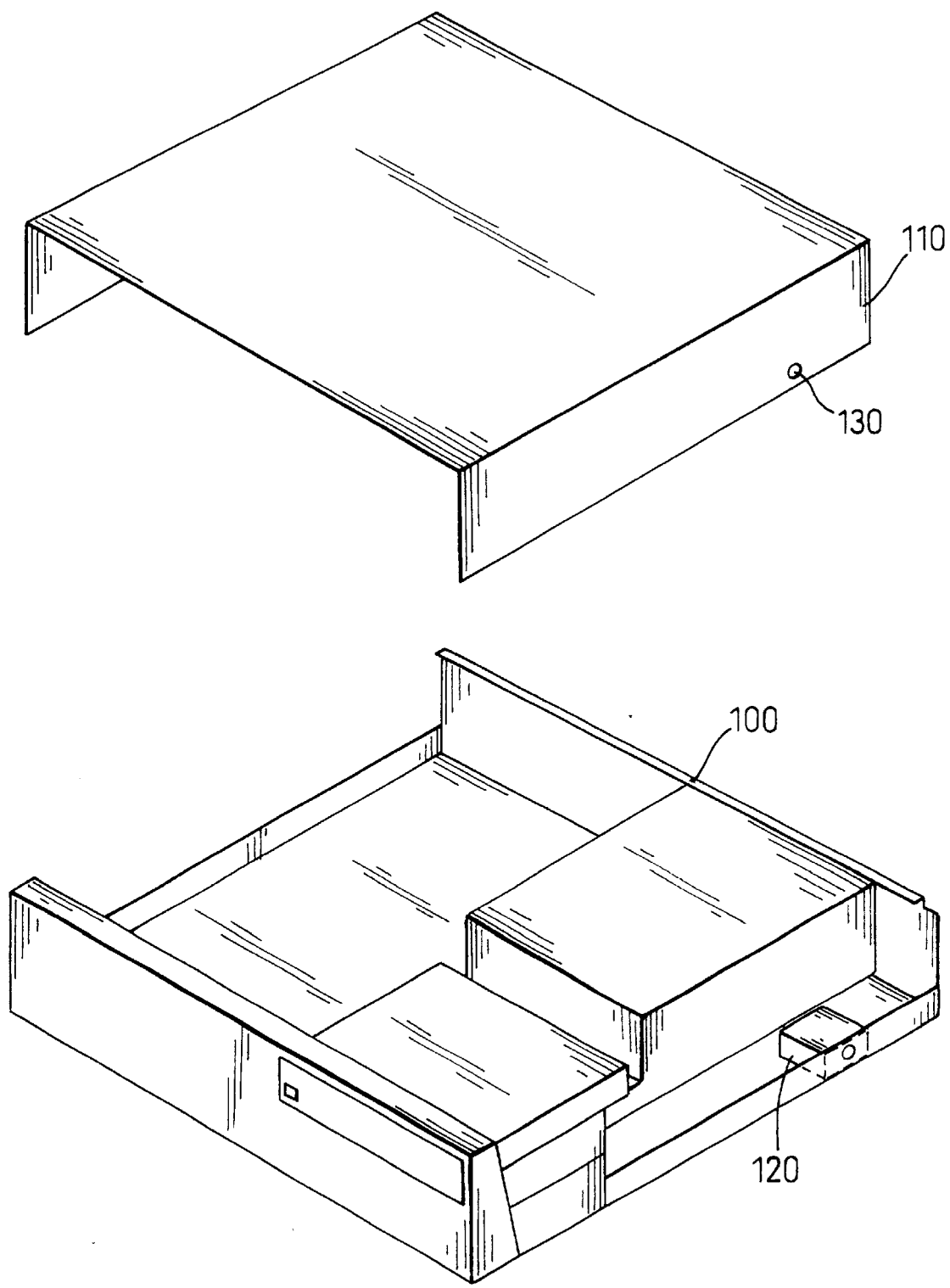
FIG. 1 is an exploded view of a personal computer.

FIG. 1 shows a personal computer having a casing which is in two parts, a chassis element 100 and a cover 110. Chassis element 100 is used to mount the operative components of the computer, such as the motherboard, power supply and storage devices.

Mounted on chassis 100 is lock device 120 used to lock cover 110 to chassis 100. In this implementation, cover 110 has an opening 130 that is engaged by a bolt in lock device 120. The bolt passes through the opening 130 preventing the cover from being removed. In this implementation lock device 120 can be fixed to bottom chassis with self-tapping screws. Special screw heads can be used, for instance torx head print with central pin, in order to prevent lock device 120 being removed by simply undoing the screws.

The lock device described is of course suitable for locking any other type of computer cases.

Figure 2:
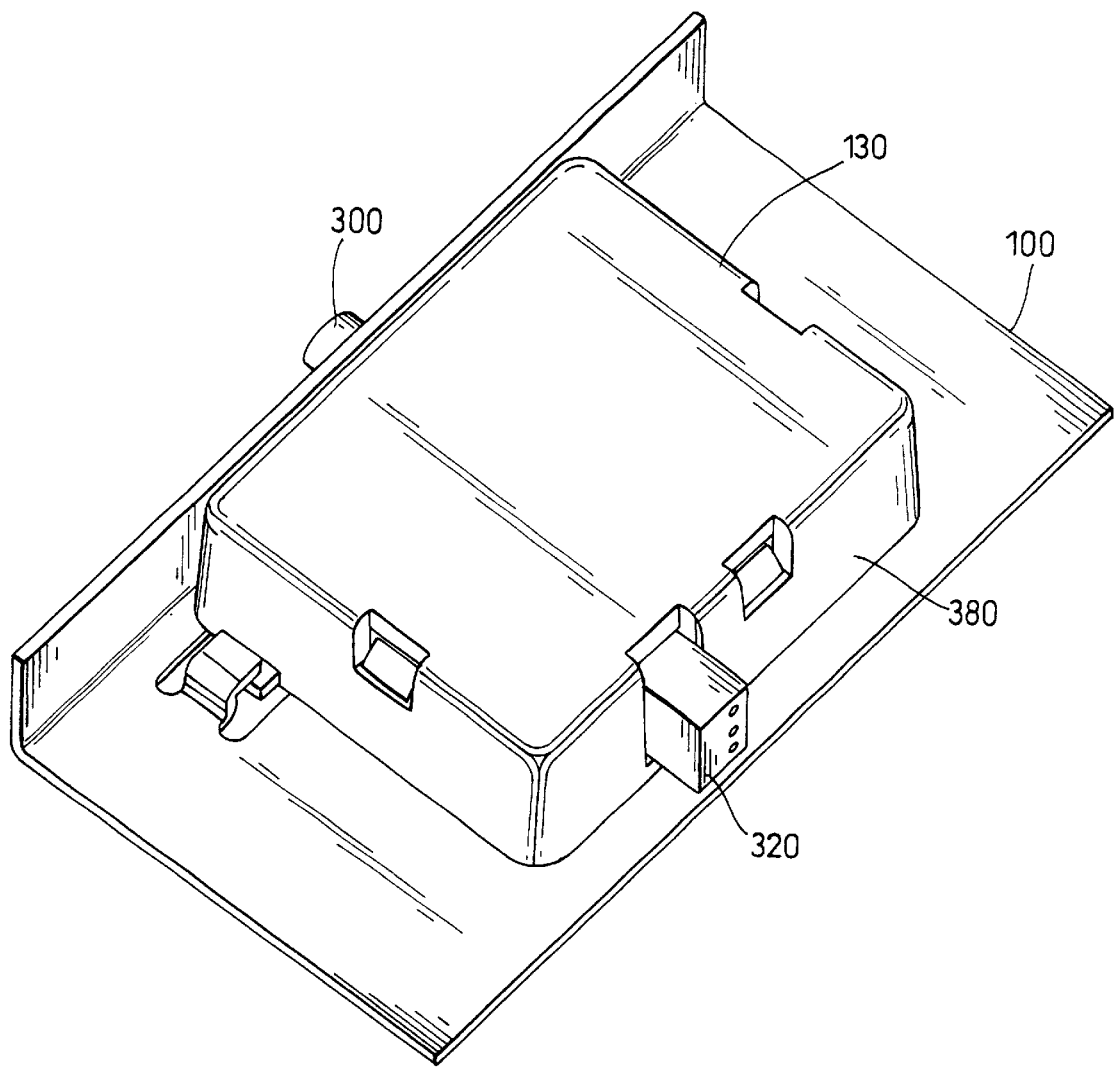
FIG. 2 shows a lock assembly for a personal computer.

FIG. 2 is a close-up view showing lock device 120 in more detail.

Figure 3A:
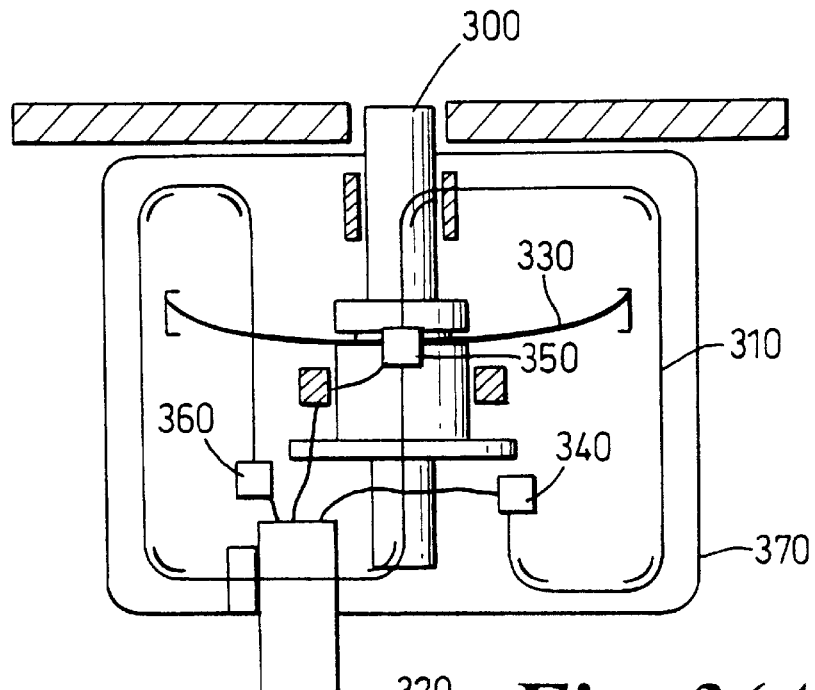
FIGS. 3A and B are cross-sectional views of the lock assembly of FIG. 2.
Figure 3B:
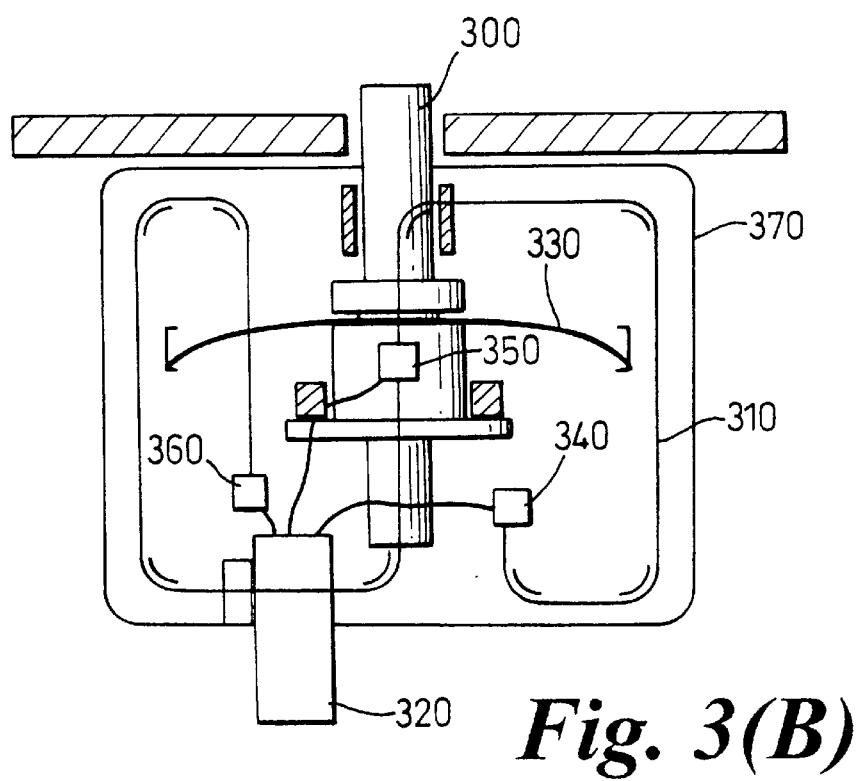

FIGS. 3A and 3B are cross-sectional views showing the operative components of lock device 130. Bolt 300 is movable between a locked position shown in FIG. 3B and an unlocked position shown in FIG. 3A.

Bolt 300 is moved between these two positions by a shape memory wire 310 of serpentine form. Shape memory wire changes its configuration in response to electrical signals supplied at connector 320. One suitable commercially available wire is Tinel Alloy K wire available from Raychem Corporation of diameter 0.3 mm—this is a binary NiTi Alloy. This type of wire is rated to survive around 20 000 duty cycles. Other types of commercially available shape-memory wires are also suitable however. As a comparison the MSA L-09432 solenoid used in the prior art is rated to survive 500 000 duty cycles.

Leaf spring 330 made of stainless steel provides a bistable mechanical bias to bias bolt 300 into either the locked position or the unlocked position.

Shape memory wire 310 is connected to three terminals denoted 340, 350 and 360. The part of the wire between terminals 340 and 350 forms a first current path. When electrical current is passed between terminals 340 and 350, this part of the wire contracts to pull the bolt 300 into the lock position. The part of the wire between terminals 350 and 360 forms a second current path. When electrical current is passed between terminals 350 and 360, this part of the wire contracts to pull bolt 300 into the unlock position.

The lock can therefore be controlled by software running on the computer that applies lock and unlock signals to the device. A lock signal is represented by a voltage applied between terminal 340 and 350 and an unlock signal being represented by a voltage applied between terminal 350 and terminal 360.

Bolt 300 connector 320 and shape memory wire 310 are all supported on a plastic tray 370 which is provided with suitable guide members for the moving parts. The tray is closed with a plastic cover 380 that clips to plastic tray 370 (shown in FIG. 2).

Although specific embodiments of the invention have been described, the invention is not to be limited to the specific arrangement so described. The invention is limited only by the claims.

What is claimed is:

1. A lock assembly comprising a lock member movable between a locked position and an unlocked position and a shape memory wire arranged to move the lock member between the locked position and the unlocked position in response to one or more electrical signals that generate currents therein, the shape memory wire including a first portion forming a first current path for pulling the lock member into the locked position and a second portion forming a second current path for pulling the lock member into the unlocked position.

2. A lock assembly as claimed in claim 1, comprising a bistable mechanical biasing arrangement for biasing the lock member into the locked position or the unlocked position.

3. A lock assembly as claimed in claim 1, wherein the mechanical biasing arrangement is a leaf spring.

4. A lock assembly as claimed in claim 1, wherein one end of the first current path and one end of the second current path are connected to a common terminal.

5. A lock assembly as claimed in claim 4, wherein the first and second current paths each comprise respective terminals at ends remote from the common terminal, a lock signal being represented by a voltage applied between the terminal at the end of the first current path and the common terminal and an unlock signal being represented by a voltage applied between the terminal at the end of the second current path and the common terminal.

6. A lock assembly as claimed in claim 1, arranged in a computer, said computer comprising a housing having a first section having a wall defining an opening for allowing access to internal components of the computer; a cover section for engaging the first section to close the housing; and wherein said lock assembly is arranged to prevent or allow disengagement of the first section and the cover.

7. A lock assembly as claimed in claim 1, arranged in a computer to prevent or allow disengagement or a component thereof.

8. A lock assembly comprising a lock member movable between a locked position and an unlocked position and a shape memory wire arranged to move the lock member between the locked position and the unlocked position in response to one or more electrical signals that generate currents therein and a bistable mechanical biasing arrangement for biasing the lock member into the locked position or the unlocked position, the shape memory wire including a first portion forming a first current path for pulling the lock member into the lock position and a second portion forming a second current path for pulling the lock member into the unlock position, one end of the first current path and one end of the second current path being connected to a common terminal.

9. A lock assembly as claimed in claim 8, wherein the mechanical biasing arrangement is a leaf spring.

10. A lock assembly as claimed in claim 8, wherein the first and second current paths each comprise respective terminals at ends remote from the common terminal, a lock signal being represented by a voltage applied between the terminal at the end of the first current path and the common terminal and an unlock signal being represented by a voltage applied between the terminal at the end of the second current path and the common terminal.

* * * * *